(12) United States Patent
Ozolins

(10) Patent No.: US 7,994,898 B2
(45) Date of Patent: Aug. 9, 2011

(54) PORTABLE ACCESS DEVICE

(75) Inventor: Helmars E. Ozolins, Orient, NY (US)

(73) Assignee: Bloomberg Finance L.P.

( * ) Notice: Subject to any disclaimer, the term of this patent is extended or adjusted under 35 U.S.C. 154(b) by 36 days.

(21) Appl. No.: 12/485,421

(22) Filed: Jun. 16, 2009

(65) Prior Publication Data
US 2009/0273442 A1    Nov. 5, 2009

Related U.S. Application Data

(63) Continuation of application No. 10/651,361, filed on Aug. 29, 2003, now abandoned.

(51) Int. Cl.
G06F 7/00    (2006.01)
(52) U.S. Cl. .......................... 340/5.82; 340/5.8; 340/5.81
(58) Field of Classification Search .................. 340/5.82, 340/5.81, 5.8
See application file for complete search history.

(56) References Cited

U.S. PATENT DOCUMENTS

| | | | |
|---|---|---|---|
| 4,329,684 A | 5/1982 | Monteath et al. | |
| 4,582,985 A | 4/1986 | Lofberg | |
| 4,599,489 A | 7/1986 | Cargile | |
| 4,720,860 A | 1/1988 | Weiss | |
| 4,807,031 A | 2/1989 | Broughton et al. | |
| 4,819,267 A | 4/1989 | Cargile et al. | |
| 4,885,778 A | 12/1989 | Weiss | |
| 4,890,323 A | 12/1989 | Beker et al. | |
| 4,910,775 A | 3/1990 | Yves et al. | |
| 4,993,068 A | 2/1991 | Piosenka et al. | |
| 4,995,086 A | 2/1991 | Lilley et al. | |
| 4,998,279 A | 3/1991 | Weiss | |
| 4,999,617 A | 3/1991 | Uemura et al. | |
| 5,060,263 A | 10/1991 | Bosen et al. | |
| 5,131,038 A | 7/1992 | Puhl et al. | |
| 5,136,644 A | 8/1992 | Audebert et al. | |
| 5,146,499 A | 9/1992 | Geffrotin | |
| 5,272,754 A | 12/1993 | Boerbert | |

(Continued)

FOREIGN PATENT DOCUMENTS

DE    41 25 198    7/1991

(Continued)

OTHER PUBLICATIONS

GlobalRoad—SAFE: Design Takes on Risk—Property (Catalog), printed out in year 2010.*

(Continued)

*Primary Examiner* — David Y Jung
(74) *Attorney, Agent, or Firm* — Frommer Lawrence & Haug, LLP

(57) ABSTRACT

Portable devices, methods, and systems for controlling access to computers and other secure systems such as systems protecting secure premises, by processing data supplied by the individual seeking access to the system and data supplied by the system to which the prospective user seeks access, to determine whether access by the individual is to be authorized or enabled. In one embodiment the invention provides a device for providing a code that may be used to access a system such as a computer or security system. The device comprises an output device and at least one processor. The processor processes data representing a biometric characteristic of a prospective user of the system and a signal provided by the system, and, depending upon a result of the processing, provides to the output device a code that may be used to access the system.

4 Claims, 8 Drawing Sheets

U.S. PATENT DOCUMENTS

| | | | |
|---|---|---|---|
| 5,280,527 A | 1/1994 | Gillman et al. | |
| 5,323,465 A | 6/1994 | Avarne | |
| 5,347,580 A | 9/1994 | Molva et al. | |
| 5,432,851 A | 7/1995 | Scheidt et al. | |
| 5,450,491 A | 9/1995 | McNair | |
| 5,481,610 A | 1/1996 | Doiron et al. | |
| 5,483,595 A | 1/1996 | Owen | |
| 5,488,571 A | 1/1996 | Jacobs et al. | |
| 5,535,147 A | 7/1996 | Jacobs et al. | |
| 5,623,637 A | 4/1997 | Jones et al. | |
| 5,652,602 A | 7/1997 | Fishman et al. | |
| 5,668,876 A | 9/1997 | Falk et al. | |
| 5,680,460 A | 10/1997 | Tomko et al. | |
| 5,719,950 A | 2/1998 | Osten et al. | |
| 5,801,664 A | 9/1998 | Seidensticker et al. | |
| 5,850,304 A | 12/1998 | Elmers et al. | |
| 5,852,615 A | 12/1998 | Holo et al. | |
| 5,853,615 A | 12/1998 | Suhr | |
| 5,937,065 A | 8/1999 | Simon et al. | |
| 5,978,656 A | 11/1999 | Farine et al. | |
| 5,986,623 A | 11/1999 | Chiloyan et al. | |
| 5,995,630 A | 11/1999 | Borza | |
| 6,011,858 A | 1/2000 | Stock et al. | |
| 6,016,476 A | 1/2000 | Maes et al. | |
| 6,035,395 A | 3/2000 | Saito | |
| 6,038,551 A | 3/2000 | Barlow et al. | |
| 6,038,666 A | 3/2000 | Hsu et al. | |
| 6,078,908 A | 6/2000 | Schmitz | |
| 6,088,450 A | 7/2000 | Davis et al. | |
| 6,202,151 B1 | 3/2001 | Musgrave et al. | |
| 6,213,403 B1 | 4/2001 | Bates, III | |
| 6,281,820 B1 | 8/2001 | Fields | |
| 6,300,873 B1 | 10/2001 | Kucharczyk et al. | |
| 6,463,537 B1 | 10/2002 | Tello | |
| 6,466,145 B2 | 10/2002 | Fields | |
| 6,484,260 B1 | 11/2002 | Scott et al. | |
| 6,490,681 B1 | 12/2002 | Kobayashi et al. | |
| 6,549,623 B1 | 4/2003 | Scheidt et al. | |
| 6,618,806 B1 | 9/2003 | Brown et al. | |
| 6,819,219 B1 | 11/2004 | Bolle et al. | |
| 6,850,147 B2 | 2/2005 | Prokoski et al. | |
| 6,965,685 B1 | 11/2005 | Smith | |
| 6,970,853 B2 | 11/2005 | Schutzer | |
| 6,992,580 B2 | 1/2006 | Kotzin et al. | |
| 7,104,457 B2 | 9/2006 | Skygebjerg | |
| 7,155,416 B2 | 12/2006 | Shatford | |
| 7,636,854 B2 | 12/2009 | Muller et al. | 713/186 |
| 2002/0140542 A1 | 10/2002 | Prokoski et al. | |
| 2004/0148510 A1 | 7/2004 | Muller et al. | |
| 2004/0230812 A1 | 11/2004 | Muller et al. | |

FOREIGN PATENT DOCUMENTS

| | | |
|---|---|---|
| DE | 198 16 117 | 10/1999 |
| EP | 1 237 091 | 9/2002 |
| EP | 1 255 178 | 2/2004 |
| JP | 2001-052181 | 2/2001 |
| JP | 2001-092668 | 4/2001 |
| JP | 2003-178031 | 6/2003 |
| WO | WO 87/03977 | 7/1987 |
| WO | WO 99/08238 | 2/1999 |
| WO | WO 00/48064 | 8/2000 |
| WO | WO 02091139 A2 | 11/2002 |
| WO | WO 03/021523 | 3/2003 |

OTHER PUBLICATIONS http://www.antennadesign.com/about/awards, printed out in year 2010.*

BLOOMBERG B-UNIT™, as printed out in year 2010.* http://www.antennadesign.com/Product/14-bunit, printed out in year 2010.* bUNIT.—The Red Ferret Journal, year 2005.* http://itp.tisch.nyu.edu/object/itpnews_momasafe.html, printed out in year 2010.* http://blog.robwebb2k.com/2007/08/03/corporate-branding-the-bloomberg-b-unit, printed out in year 2010.* http://images.businessweek.com/ss/05/06/idea2005/source/19.htm, printed out in year 2010.* http://www.notcot.org/post/49/, printed out in year 2010.*

User authentication on mobile devices with dynamical selection of biometric techniques for optimal performance ; Xiaobu Yuan; Rahim, M.S.; Robotics and Biomimetics (ROBIO), 2010 IEEE International Conference on ; Publication Year: 2010 , pp. 333-338.*

Omura, Jim K., "Novel Applications of Cryptography in Digital Communications" May 1990, IEEE Communications Magazine, pp. 21-29.

Konig, Hans-Peter, "Cryptographic Identification Methods for Smart Cards in the Process of Standardization" Jun. 1991, IEEE Communications Magazine, pp. 42-48.

Clark, Paul C. et al., "BITS: A Smartcard Protected Operating System" Nov. 1994/vol. 37, No. 11, Communications of the ACM, pp. 66-70 and 94.

Thomasson, J.P. et al., "Smartcards: Portable Security" © 1997 IEEE, pp. 259-265.

Hachez, Gael et al., "Biometrics, Access Control, Smart Cards: A Not So Simple Combination" © 1998, 16 pgs.

Vedder, Klaus et al., "Smart Cards—Requirements, Properties, and Applications" COSIC'97 Course, LNCS 1528, 1998, pp. 307-331.

Newing, Rod, "Understanding Smart Cards" Update 117, Jul. 1998, pp. 7-13.

Joelson, Daniel, "The Phoenix in Data Security" Bank Technology News, New York: Jul. 1998, vol. 11, Iss. 7, 4 pgs.

Huopio, Simio, "Biometric Identification" Last Updated Nov. 27, 1998, 13 pgs.

Rice, Joseph, "A Third Way for Biometric Technology" IS Audit & Control Journal, vol. III, 1999, pp. 16-18.

"Management Summary~The Busy Persons Guide to Biometrics" © 1999, 12 pgs.

Uchida, Kaoru, "Fingerprint-based User-friendly Interface and Pocket-PID for Mobile Authentication", Proceedings of the Int'l Conferenceon Pattern Recognition, 2000, 5 pgs.

Chen, Liqun et al., "On Enhancing Biometric Authentication with Data Protection", © 2000 IEEE, pp. 249-252.

"American Biometric Company Launches Trinity 2.5"PR Newswire, Jan. 17, 2000, 3 pgs.

"Simplify Your Advanced Remote-User Authentication and Sophisticated Transactions" DIGIPASS® 700, © 2001, 2 pgs.

Digipass® Family of Authentication Devices, © 2001, 13 pgs.

Johansson, Linda, "Trade-offs Between Usability and Security", Apr. 9, 2001, 128 pgs.

"Two-Factor Authentication—Making Sense of all the Options", RAINBOW Technologies, May 29, 2001, pp. 1- 10.

Sinclair, Joseph, "Securing Systems: A Three-Pronged Solution for Identifying Users", Jun. 1, 2001, 9 pgs.

Ratha, N.K. et al., "Enhancing Security and Privacy in Biometrics-Based Authentication Systems", IBM Systems Journal, vol. 40, Nov. 3, 2001, pp. 614-634.

U.S. Appl. No. 12/345,575, Aug. 29, 2003 (effective date), Ozolins.

* cited by examiner

PORTABLE ACCESS DEVICE

This application is a continuation of application Ser. No. 10/651,361 filed Dec. 29, 2008 the entire disclosure which is incorporated herein by reference.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

The invention provides devices, methods, and systems for controlling access to secure systems. In particular, the invention provides devices, methods, and systems for controlling access to computers and other secure systems using a portable access device.

Devices for controlling access to systems are disclosed in U.S. Pat. Nos. 5,432,851 and 6,490,680 to Scheidt et al.; U.S. Pat. No. 5,272,754 to Boerbert; U.S. Pat. No. 6,463,537 to Tello; and U.S. Pat. No. 5,347,580 to Molva et al.

SUMMARY OF THE INVENTION

The invention provides devices, methods and systems for controlling access to systems such as computers and systems controlling access to secure facilities or premises, etc., using information provided by a person seeking access to the system, and by the system to which the person is seeking access, to determine whether access by that person is to be authorized. The information to be provided by the person seeking access identifies the person. The information to be provided by the system is made available at a location at which the information to be provided by the person seeking access are input to the system.

In preferred embodiments, the information to be provided by the person seeking access can only be provided in the presence of that person, e.g., biometric data obtained directly from the person. In such embodiments, the person seeking access must be physically present at the location of the system at which the information is to be input to provide his or her information, together with a device (also referred to as an "access device") which receives the information provided by the system. Information from the person seeking access and the system is then used at the system's input location to determine whether to authorize the person to access the system. If the person seeking access is determined to be authorized, in various embodiments, a signal or code is provided that can be tested, e.g., by the system, to determine whether access is to be provided.

If, as a result of processing information received from the system and from the person seeking access, it is determined that access by that person is not authorized, no code may be provided, or an invalid code, a warning, a notification of access denial, or other suitable signal(s) may be provided.

In preferred embodiments, the access device according to the invention uses the information supplied by the person seeking access and the system, and provides the signal or code to the person, who can then provide it to the system for which access is sought by the person, or directly to the system. In one embodiment, the portable device provides a code to a person seeking access, and that person inputs the code to the system, which then provides access if the code is found to be authorized. In another embodiment, the access device may output a coded signal directly to the system.

Since information is provided both by the person seeking access and the system for which access is sought, the access device must be present at the system location which is to receive the code or coded signal to be provided by the device, and the person must provide his or her information to the access device while at the system location. In a preferred embodiment, the person's information is biometrically based, so that the person must be present at the system location when the system provides its information.

The access device may include on-board devices that receive information provided by the person and system, or signals from such devices that are not on board the portable device but linked thereto.

In one embodiment, the invention provides a portable access device for providing the code or coded signal that may be tested to determine whether to provide access to the system. In a preferred embodiment, such a device comprises an output device and at least one processor. The processor processes information provided by the person seeking access and the system and, depending upon a result of the processing, provides to the output device a code that may be used to access the system, or not, depending upon the provided information.

As mentioned, the information representing a biometric characteristic of a person seeking access to the system includes information representing any physical characteristic of the prospective user which may be used to identify, with a certainty sufficient in view of the purposes and requirements of the system to which access is being sought, to uniquely identify the person as authorized to receive access. Such information can include, for example, data representing fingerprint patterns or finger images, retina scans, or DNA samples, and is acquired by and/or provided to the processor(s) of the portable access device by any suitable devices, such as one or more biometric sensors. A large number and variety of suitable biometric characteristics, and methods and sensors for acquiring and processing information representing them, such as fingerprint and retina scanners, are known, and are continuously being developed. The identification of suitable biometric characteristics, and devices and methods for acquiring and processing information representing them, in view of the purposes and requirements of systems to be protected by controlled access, is within the ability of those having ordinary skill in the art.

In preferred embodiments of the invention, information representing biometric characteristics of prospective users is read or sampled directly from the person seeking access. Thus, in some embodiments one or more sensors suitable for acquiring information representing biometric characteristics of a person seeking access are included in the access device, and configured to provide acquired information to one or more processors for use in determining whether to grant the person from whom the information is acquired access to the system.

Some embodiments of the invention process signals provided by the system to which access is being sought, in addition to biometric information related to a person seeking access as part of the process of determining whether access is to be authorized. The use of information provided by the system to which access is being sought enables, among other things, the determination as to whether access is to be authorized to be made in various modes according to circumstances. For example, processing related to a request from a person seeking to access a computer system from a user station, designated as a primary entry station, from which access by the person is conditionally pre-authorized, or partly pre-authorized, may proceed in a different way than processing related to a request from the same person attempting to access the same computer system from a user station that is not designated as primary.

Information provided by the system to which access is being sought for processing by the access device may be provided to the access device in any suitable manner. Many systems, devices, and methods for signal transfer are known, and will hereafter be developed. For example, in some embodiments of the invention, the access device comprises one or more sensors for receiving signals from the system to be accessed. Such sensors may be used, alone or in combination, to receive and pass to the processor, visible-light, infrared, or other electromagnetic, audio, or other stimuli suitable for carrying information, either by wired or wireless means. The selection of suitable systems, devices, and methods for providing such signals to the processor will be well within the ability of those having ordinary skill in the art, in view of this disclosure.

The one or more processors for processing biometric information provided by the person seeking access and information provided by the system comprise any suitable data and signal processors, including any hardware, firmware, and software, suitable for meeting the purposes described herein. In some embodiments of the invention such processors comprise one or more application specific integrated circuits (ASICs) and associated devices and software. Processing for determining whether to provide to an output device a code that may be used to access the system, depending upon the biometric information and the information provided by the system to be accessed, may be performed entirely by processors included in the portable device, or partly by processors included in the portable device and partly by processors included in the system to be accessed, in a data sharing or shared processing scheme, or in other suitable ways consistent with the purposes disclosed herein.

In some embodiments, processing for determining whether to provide to an output device a code that may be used to access the system, using the biometric information and the information provided by the system to be accessed, comprises conditioning provision of the code to the output device upon a correlation between the information representing the biometric characteristic and stored biometric information. For example, biometric information acquired by a biometric sensor and provided to the processor(s) is compared to stored biometric information, and a determination is made as to whether a correlation between the provided and stored information is satisfied. In the event that a satisfactory correlation is established, the processor provides to the output device a code useable for accessing the system. The establishment and evaluation of correlations between information acquired from prospective system users and stored biometric information is known, and is within the ability of those having ordinary skill in the arts.

Embodiments of access devices according to the invention may comprise memory for storing biometric information for use in determining whether to provide an access code that may be used to access the secure system to an output device, or otherwise enable access to the secure system. In other embodiments, such stored biometric information may be stored in memory associated with the system to be accessed, and information and/or processing for determining whether to provide a useable access code is shared between the access device and the system to be accessed.

The output devices to which the processors provide codes that may be used to access the secure system may be of any type suitable for imparting to a prospective user a code suitable for gaining access to the system, such as a human-readable sequence of alphanumeric or other characters. For example, display devices such as LEDs, LCDs, CRTs; or printing or audio devices may be used. In a preferred embodiment, a small LCD display is used, in order to reduce physical size and power requirements for the portable access device.

In some embodiments, an access device according to the invention comprises a housing for supporting sensors, processors, and other items incorporated by the portable device, and the housing includes one or more surfaces for bearing devices useful for identifying users of the access device or other individuals, such as photographic images, electromagnetic strips, and/or other devices for storing and/or providing access to identifiers or other information. Such device-bearing surfaces are useful, for example, where the access device comprises relatively compact components, e.g., suitable for making the access device portable, configured such that the housing can form a suitably-sized and -shaped casing to act as an identification card. Such embodiments may further comprise electromagnetic strips and other devices for storing and/or providing access to identification and other data.

In other embodiments, the invention provides methods, and suitable processors and other components, including software, for providing codes for use in accessing systems of the type described herein. Such methods are preferably performed by portable access devices and comprise processing information received from a biometric sensor associated with a portable access device to establish a correlation between the received biometric information and stored biometric information; and, if the correlation satisfies a correlation criteria, providing to an output device of the portable access device an access code that may be used to access the system, otherwise not providing to the output device a code that may be used to access the system. The access code, where provided, is determined using a signal received by a signal sensor associated with the portable access device from a signal generator associated with the system to be accessed. The access code that may be used to access to the system is preferably session-specific. The provision of session-specific access codes helps, for example, to ensure that a specific authorized user offering access to the system is physically present at the point of access to the system.

In still other embodiments, the invention provides methods and suitable processors and other components for providing codes for use in accessing systems of the type described herein, where the codes and the determination of whether to provide them may be made according to a plurality of processing modes, the mode used in a given case being determined by the circumstances of the request for access. For example, a signal received by a signal sensor of the portable access device from a signal generator associated with a system to be accessed may be processed to determine whether the system has received information indicating that a person seeking access to the system is attempting to access the system using a conditionally pre-authorized input device (e.g., at a primary entry station). If it is determined that this person is attempting to access the system using a conditionally pre-authorized input device, an access code that may be used to access the system is provided to an output device regardless of any biometric information received from a biometric sensor of the portable access device. Otherwise an access code that may be used to access the system is provided only upon determination that a correlation criterion or criteria is satisfied by biometric information received from the biometric sensor and biometric information otherwise accessed by the access device.

The invention also provides systems for working with portable access devices according to the invention, including all suitable software, processors, memory devices, etc.

BRIEF DESCRIPTION OF THE DRAWINGS

The invention is illustrated in the figures of the accompanying drawings, which are meant to be exemplary and not limiting, and in which like references are intended to refer to like or corresponding parts.

DETAILED DESCRIPTION OF THE PREFERRED EMBODIMENTS

Preferred embodiments of methods, systems, and apparatus according to the invention are described through reference to the Drawings.

Figure 1:
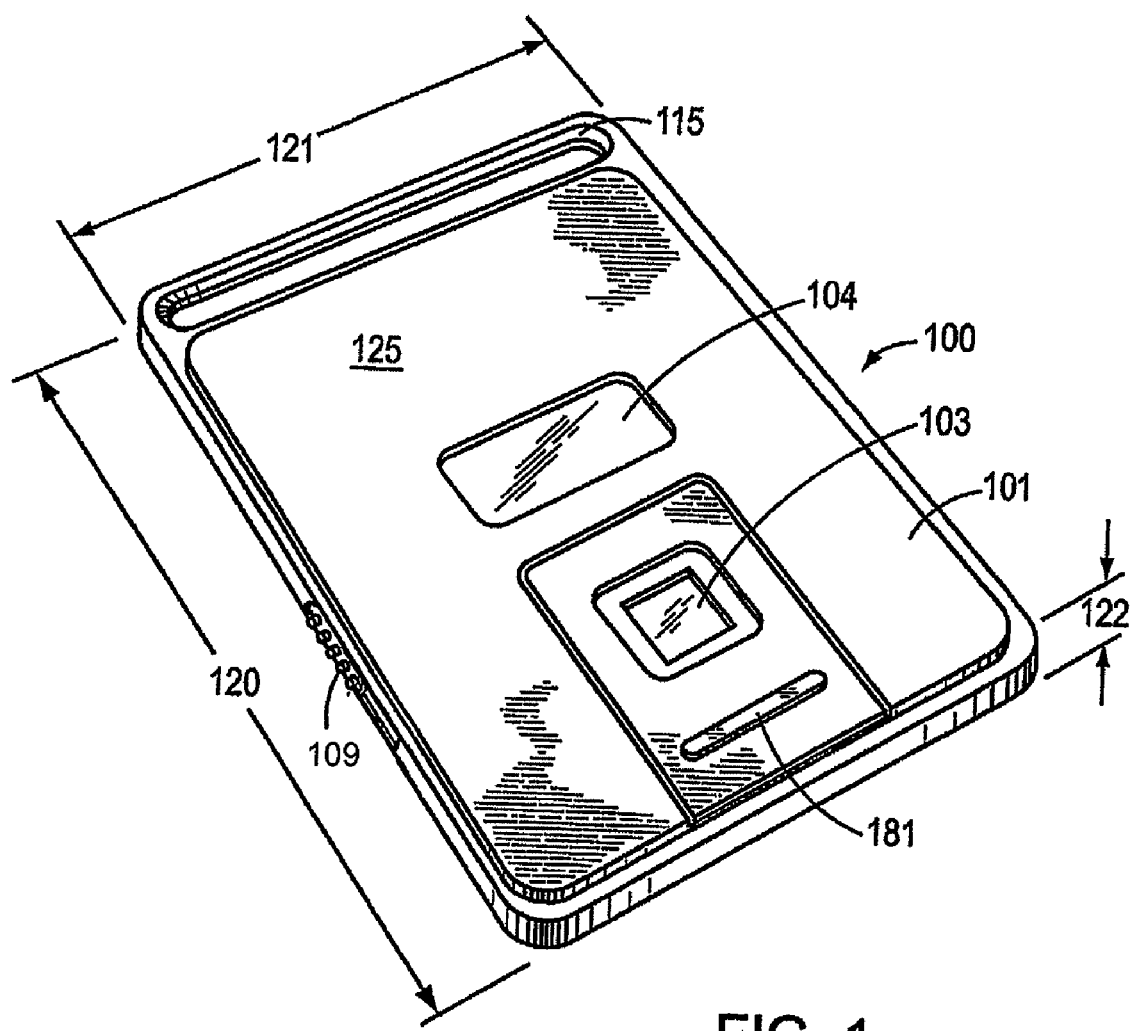
FIG. 1 is a schematic perspective view of a preferred embodiment of a portable access device according to the invention.
Figure 2:
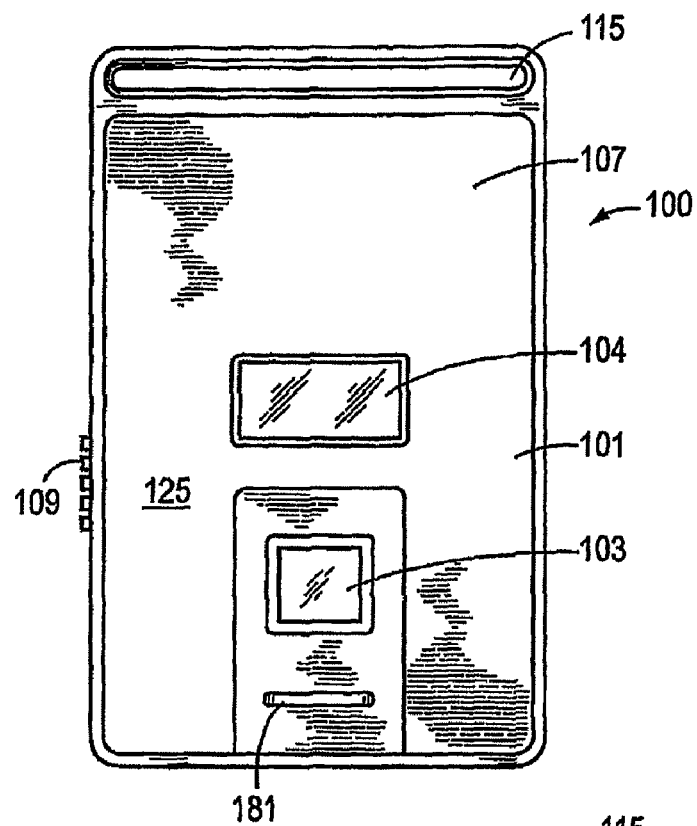
FIG. 2 is a schematic front elevation of a preferred embodiment of a portable access device according to the invention.
Figure 3:
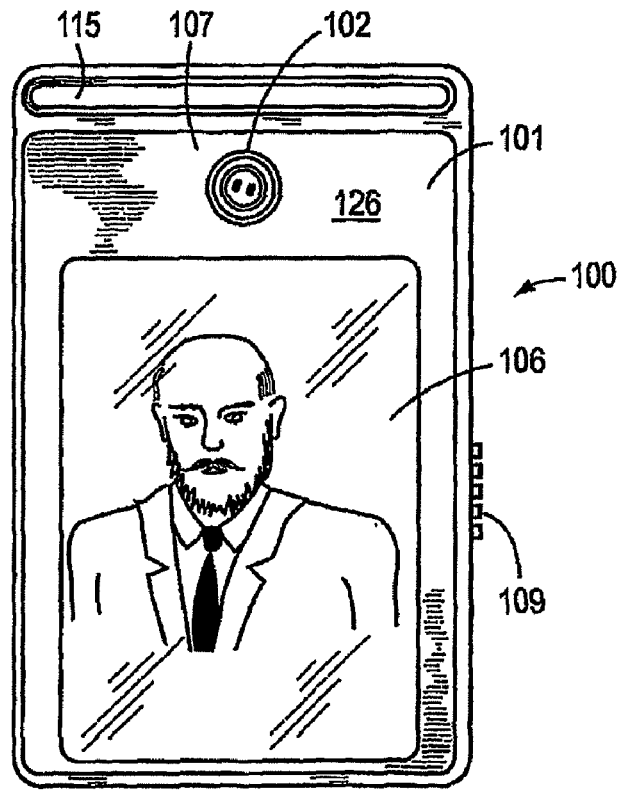
FIG. 3 is a schematic rear elevation of a preferred embodiment of a portable access device according to the invention.

FIGS. 1-3 depict a preferred embodiment of a portable access device 100 according to the invention. Although the representations in the drawings and the discussion below relate to a portable access device, the invention is not so limited, and the invention may be embodied in devices other than portable devices. For example, all or some of the information provided by a person seeking access and the system may be processed by the system. In such a case, the access device need not be portable.

Portable access device 100 is useful for facilitating access to computer and other systems, and comprises: housing 101; signal sensor 102 (FIG. 3) for receiving a signal (having the information described above) from a signal generator associated with the computer system; biometric sensor 103 for acquiring information (also referred to as "data") representing a biometric characteristic of a person seeking access to the computer (or a "user" or "prospective user") 200 (see also FIG. 6), and thereby uniquely identifying the user and the user's co-location with the access device; output device 104; and at least one processor 105 (FIGS. 4, 5) for processing the acquired biometric data and the signal, and for providing to the output device an access code determined using the biometric data and the signal.

Device 100 further comprises numerous surfaces 107, including edges of the housing (for clarity unmarked by reference numerals), suitable for bearing user identification devices such as photographic image 106. Housing 101 is sized to serve conveniently as an identification card as well as an access device. In the embodiment depicted, device 100 has a length 120 of approximately 57 millimeters, a width 121 of approximately 35 millimeters, and a depth 122 of approximately 2-6 millimeters. Thus, device 100 has dimensions similar to those of a standard credit or electronic identification card such as an automatic bank card, and will fit comfortably in a hand of most human users, in a fashion such that each of the component devices associated with the device 100 may be comfortably and effectively operated, as well as fitting in pockets, wallets, etc. Device 100 as depicted in FIGS. 1-3 further comprises a slot 115 suitable for use in attaching a lanyard, cord, or other device for facilitating carrying and/or restraint of the access device, as for example by placing a cord around the neck of a user of the device.

The configuration of device 100, and in particular the external configuration, may be influenced by aesthetic, or non-functional, as well as functional considerations. For example, the configuration and dimensions of slot 115, length 120, width 121, and depth 122, as well as the choice of a generally rectangular configuration, may be influenced or determined by both functional and aesthetic considerations. Similarly, the location of various components in the device may also be influenced by aesthetic considerations. For example, the placement of biometric sensor 103 on a first surface 125 of the access device, and signal sensor 126 on a second surface 126 facilitates use and operation of the access device, as explained further herein, but may also significantly influenced by aesthetic considerations, as for example in the embodiment depicted in FIGS. 1-3. A wide variety of configurations and dimensions will be found to be useful and suitable for the wide variety of uses and applications to which it is contemplated that the invention will be put. The selection of dimensions and configurations suitable for devices used for various applications will be well within the ability of designers of ordinary skill in the art, in view of this disclosure.

The portable access device 100 depicted in FIGS. 1-3 further comprises a cover (not shown) for covering biometric sensor 103. The cover is opened and closed by selectively operating switch 109, e.g., a mechanical switch which comprises a mechanical linkage that selectively rotates the cover into an open position, in which the biometric sensor 103 is exposed, and to a closed position, in which the sensor is hidden from view and protected from shocks and other harmful contacts by external objects. Switch 109 may also include and/or selectively activate one or more switches (e.g., electrical switches 142, 143 of FIG. 4), to activate processor 105 and other components of the access device 100 by activating, for example, one or more of battery 144 and power supply 141.

Covers and activating switches may also be provided for signal sensor 102, output device 104, and/or other components, as desired or suggested by the intended use of the access device 100 and the environment in which the device is expected to be used.

Figure 4:
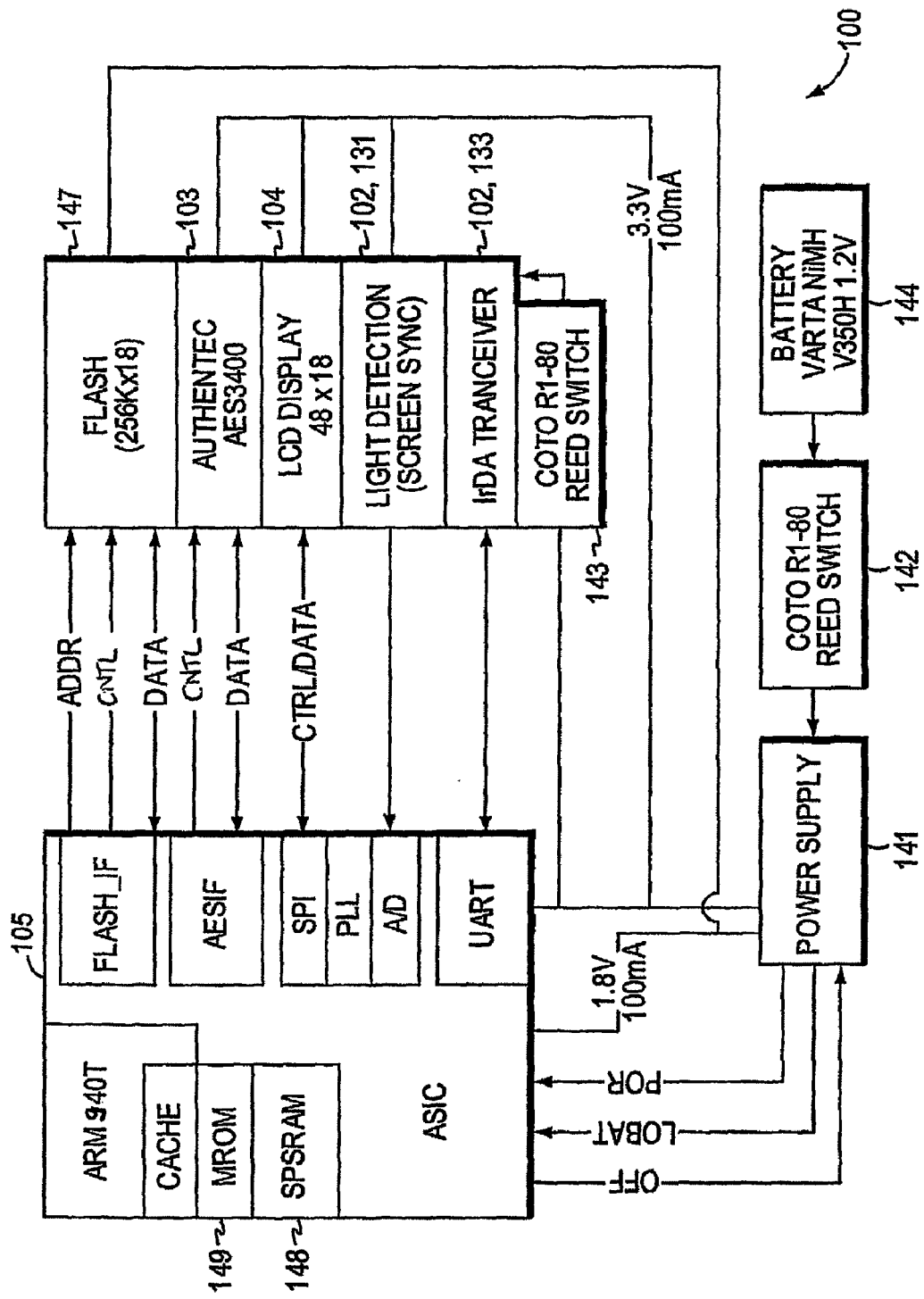
FIG. 4 is a schematic functional block diagram of a preferred embodiment of a portable access device according to the invention.

FIG. 4 is a schematic functional block diagram of a preferred embodiment of a portable access device according to the invention, showing the functional arrangement of the device's components. The diagram of FIG. 4 depicts functional connections between a plurality of signal sensors 102, biometric sensor 103, output device 104, processor 105, battery 144, power supply 141, switches 142, 143, memories 147, 148, 149, and other components.

In the embodiment shown in FIG. 4, access device 100 comprises a plurality of signal sensors 102, including visible-light sensor 131 and infrared transceiver 133. Providing a plurality of signal sensors increases the utility of the portable access device by, for example, making it operable with a greater variety of secure systems, under a broader range of operating conditions. For example, an access device comprising a visible-light sensor 131 and an infrared sensor 133 may be used both to receive data based on visible light transmitted by a display screen or other device, as herein described, and to receive and transmit data using infrared signals from infrared light generators. Access devices according to the invention incorporating pluralities of signal sensors may comprise processors and processing logic, software, etc., suitable for operation of the access devices with the respective types of signal generators. Although the sensors 131 and 133 enable wireless operation, the access device may be coupled to the system by a wire, disconnected in the case of a portable access device, over which the system provides information to the access device.

The selection of specific components for use with access devices according to the invention will depend upon the specific application(s) to which the devices are to be put, the environment(s) in which they are expected to perform, and a number of other factors that will occur to those familiar with the relevant design arts. Examples are described below for the embodiment shown in FIGS. 1-4 and 6. Identification of suitable components, existing or designed for the particular application (as for example ASICs), for systems according to the invention will be within the ability of those of ordinary skill in the relevant arts, once they have been made familiar with this disclosure.

An example of a suitable visible-light photosensor is the LX1970 visible light detector available from Microsemi Corporation, of Irvine, Calif. This component comprises, for example, an automatic brightness control that can extend battery operation and lengthen the life of large screen liquid crystal display components, and can operate in temperatures ranging from −40 deg. C. to +85 deg. C. It has an 8-pin MSOP surface mount package measuring only about 3.times.3 mm, which helps minimize the size of the access device. The Sharp Corporation also produces several suitable visible-light photosensors.

A variety of suitable infrared light sensors exist, and are continuously being developed. In some embodiments infrared transceivers are used, so that data may be both transmitted and received by the portable device 100. For example, an IrDA (Infrared Data Association) compliant device may be used for communication by the device with an infrared sensor to upload software updates or modifications, as well as to transmit and receive data related to access to the secure system, such as code seeds or access codes.

An example of a suitable biometric sensor is the AES3000 series of finger scanners, and particularly the AES3500 EntrPad® available from Authentec, Inc., of Melbourne, Fla., USA (www.authentec.com), connected to a suitable ASIC as described below via an 8-bit parallel bus, asynchronous serial interface, and/or other appropriate connection. In the example shown in FIGS. 1-3 and 6, the finger scanner is disposed within housing 101 such that it is accessible by the pad of a thumb or finger of a user while the access device 100 is held in the user's hand. Housing 101 comprises a guide ridge 181 to assist the user in orienting his finger or thumb in a position, relative to the scanner, to facilitate rapid and effective scanning of the pad surface. For example, guide 181 may be disposed so that its position corresponds with that of a joint between the tip and first knuckle of the user's finger or thumb when the finger or thumb is in position for rapid and effective scanning.

An example of a suitable output device is a dot-matrix LCD providing a 16.times.48 array of display elements. Such a display is suitable for providing access codes and various warning and instruction messages of 0-12 alphanumeric or other characters, or more. Alternatively or in addition, audio, line printing, and other types of devices may be used.

Figure 5:
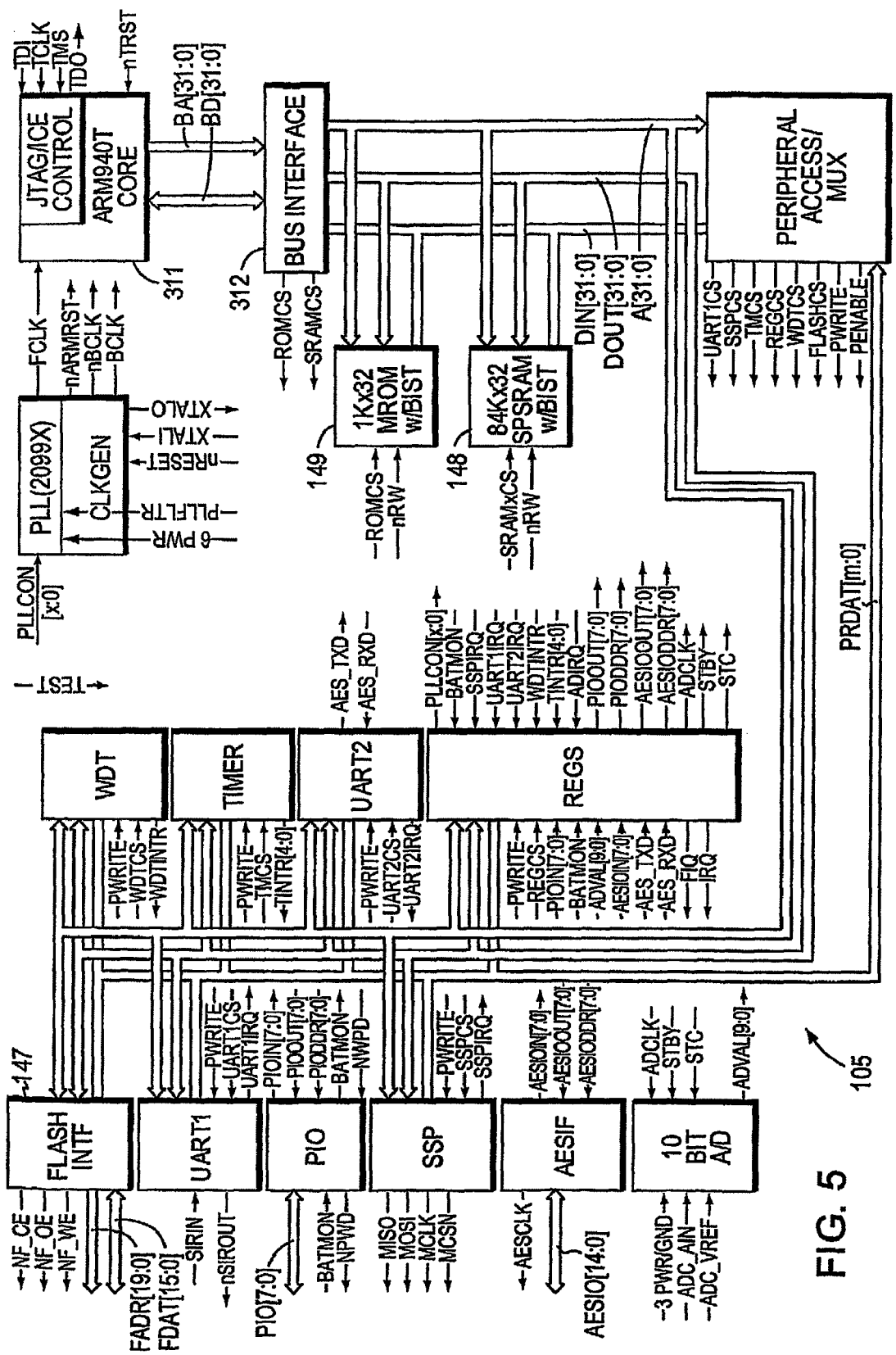
FIG. 5 is a schematic diagram of a processor, and related components, suitable for use in a portable access device according to the invention.

Processor 105 may comprise an ASIC 105 such as that shown functionally in FIGS. 4 and 5. The ASIC of FIGS. 4 and 5 is built around an ARM940T core. The ASIC of FIGS. 4 and 5 comprises the ARM9 processor, static RAM, and suitable interfaces for controlling and input/output interfacing with other components comprised by the access device. Application programming for accomplishing access processes as described herein is stored in off-chip FLASH memory 147. When the access device is activated, as for example by activating switch 142 by opening a cover for biometric sensor 103 using switch 109, processor 105 loads the application from FLASH memory 147 into on-chip RAM 148. Application processing updates can be provided via infrared sensor interface 133 or other suitable interface. In the embodiment shown in FIGS. 1-3 and 6, processor 105 has an operating temperature range of 0-70 degrees Celsius, and an operating voltage of 1.8V.+−.10%. The ARM940T processor is available through ARM Ltd., 110 Fulbourn Road, Cambridge, England.

Battery 144 may comprise a Nickel Metal Hydride (NiMH) cell providing approximately 450 mAh at 1.8V, with a life, under expected working conditions, of three years or more. Power supply 141 provides a 100 mA output at 1.8V. A wide variety of suitable batteries, power supplies, switches, and other components are available commercially through a number of manufacturers.

Housing 101 is fabricated from any suitable material having sufficient strength, rigidity, durability, damage tolerance, and corrosion and water resistance suitable for the purposes described herein. In the example of a hand-held device described herein, a combination of plastic and metal components may be used. In some embodiments security is enhanced by provided access device 100 housed in a housing 101 that is sealed, potted, etc., so that the device may not be opened, or its components accessed, by any user without rendered the device inoperable.

FIG. 5 is a schematic diagram of a processor 105 suitable for use in a portable access device according to the invention. Processor 105 comprises integrated circuit core 311, comprising an ARM940T processor as described above, and bus interface 312, with connections to memories 147, 148, 149, and to other components including biometric sensor 103, photosensor 102, and display 104.

In addition to storing application programming instructions, FLASH memory 147, and/or MROM 149 and SPSRAM 148 may store additional information, such as, for example, data representing biometric characteristics of one or more authorized prospective users of device 100 and one or more secure computer or other systems. Storage of such biometric data is useful, for example, where processor 105 processes biometric data acquired from biometric sensor 103 to determine whether a correlation exists between the acquired data and the stored biometric data, alone or in combination with one or processors associated with the secure system to which access is being sought.

Connections and interoperability between individual components shown in FIGS. 4 and 5 may be made in known manners. Many suitable components are known, or may be developed hereafter for specific applications. The selection or development of suitable components, and for suitable connections to facilitate their operation in the manner described herein, is well within the ability of those of ordinary skill in the arts, in view of this disclosure.

Figure 6:
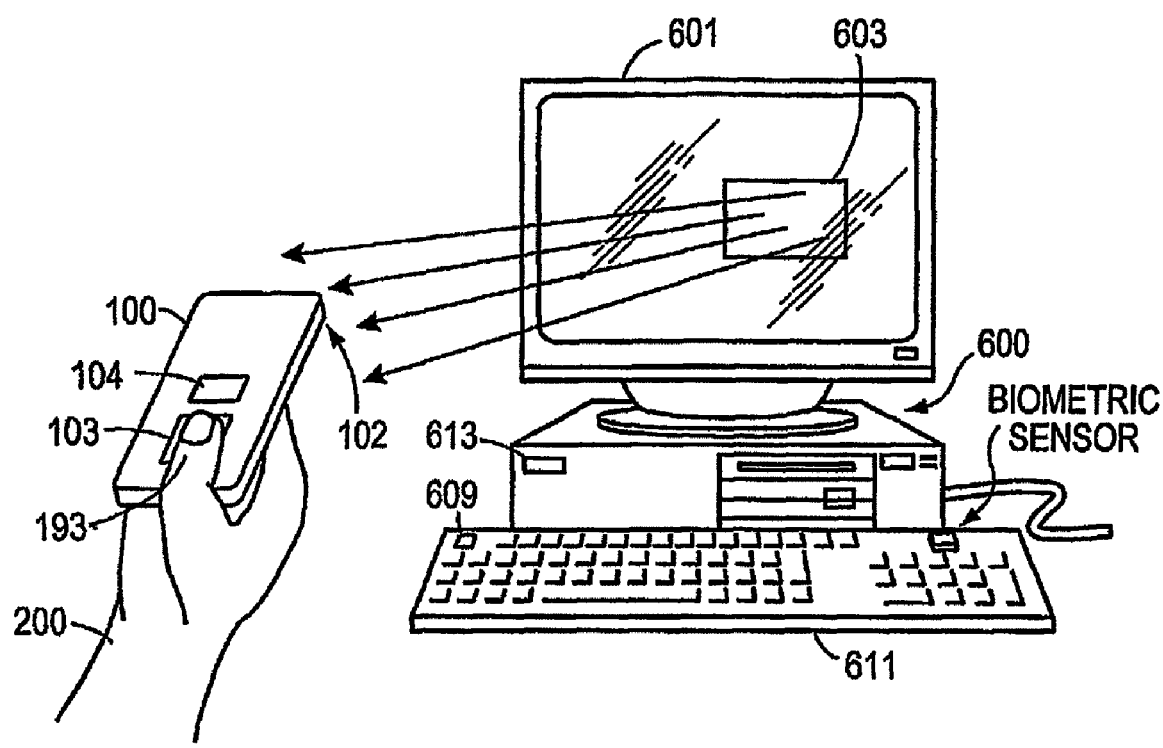
FIG. 6 is a schematic view of use of a portable access device according to a preferred embodiment of the invention.

FIG. 6 is a schematic view of a portable access device according to a preferred embodiment of the invention being used to access a computer or other secure system in accordance with processes described herein. User 200 is holding an access device 100 with a finger 193 positioned on a scanning surface of biometric sensor 103, such that the image, or print, of the pad of the user's finger 193 may be scanned, and data representing the print or image acquired, for use by processor 105 as biometric data in determining whether an access code useable for accessing a computer or other system, which may comprise computer 600 and/or any other computers or other secure systems communicatively linked to computer 600, should be displayed at output device 104 for use by user 200. For example, computer 600 may be linked to one or more secure computers or other secure systems over a private local or wide area network, or via a public network such as the Internet, and may thus act as an entry port to another secure system. Thus computer 600 and/or any computers or systems communicatively linked to computer 600 may comprise a secure system to be accessed by user 200, or may serve as an entry port for such systems.

As depicted in FIG. 6, user 200 is holding device 100 such that signal sensor 102 is exposed to, or otherwise in a position to receive signals emitted by portion 603 of display screen 601 of computer 600. In some embodiments of the invention signals are generated by the system to which access is sought by causing portion 603 of the display screen (which may include all or a portion of screen 601) to flash on and off in a series of illuminations representing data. As such screen portion 603 functions as a signal generator or light source. The intermittent flashes of light generated by screen portion 603 and sensed by signal sensor 102 are provided to processor 105, and interpreted by that or any other processor linked thereto, as representing data that may be used to provide a code, such as a session-unique, human readable code, to output device 104. The signal portion 603 may provide any suitable coded light signal. For example, the entire screen portion 603 may be modulated to provide a coded light signal, e.g., coded according to the Manchester code. This approach is suitable to cause sufficient technology displays, e.g., CRT, LCD, plasma, etc., to emit the coded light signal. Other modulation schemes may also be used, and are known to those of skill in the art.

In other embodiments signals are generated by infrared or other wireless devices, such as infrared transceiver 609 of keyboard 611 linked to computer 600, or by or by port 613, into which an access device 100 having suitable port communications devices may be inserted. Signals generated by the system to which access is sought may also be transmitted to device 100 by wire.

Figure 7:
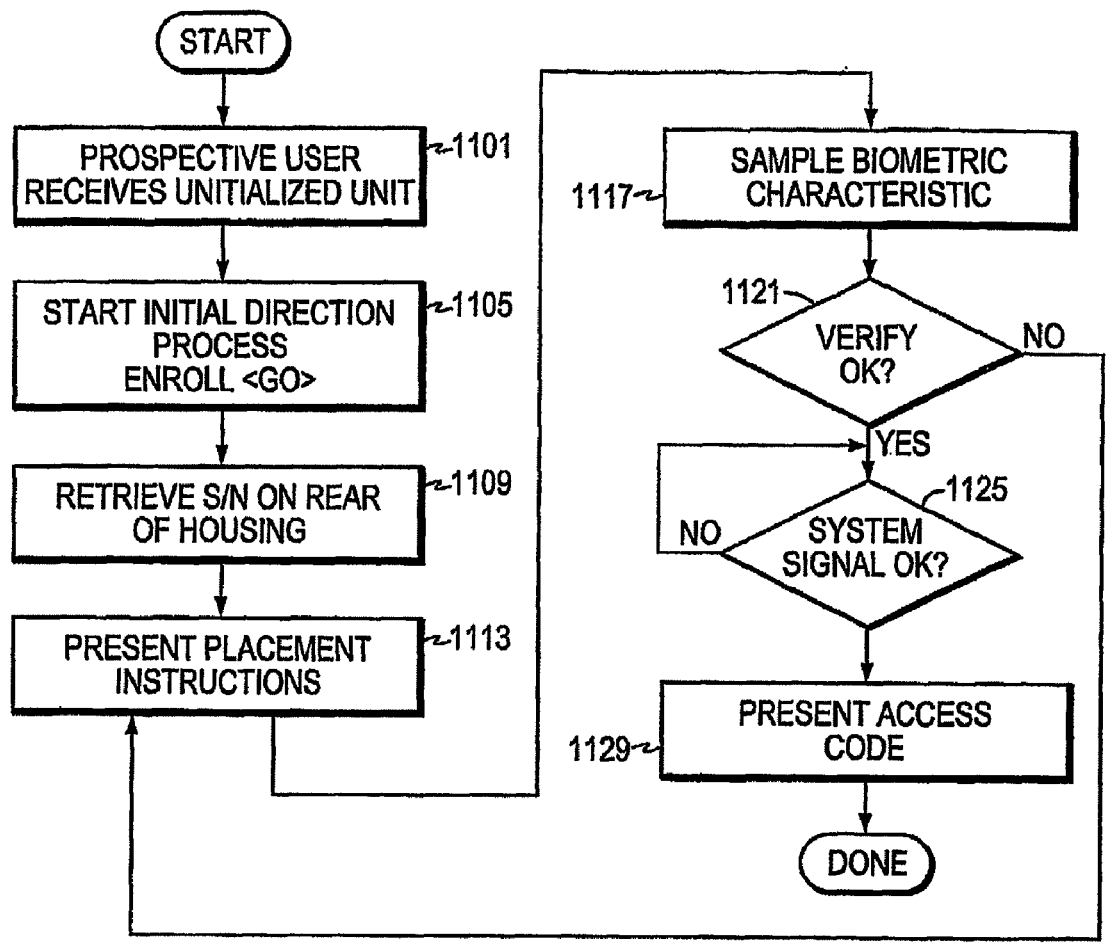
FIGS. 7-9 are schematic diagrams of process flows according to preferred embodiments of the invention.

FIG. 7 is a schematic diagram of a process flow according to a preferred embodiment of the invention. The process depicted in FIG. 7 may be used to initialize an access device according to the invention.

The access device 100 may be provided by the operator of the system for which access is sought, or by the operator's designee, in an unititialized, or unenrolled state, in which the system is incapable of recognizing any user or providing a useable access code to any user.

Referring to FIG. 7, at 1011 the access device 100 is received by the prospective user of the secure system. At 1105 the prospective user accesses an initialization, or enrollment, screen for the system, as for example by using an input device associated with the system, such as a keyboard 611 of system 600 of FIG. 6. For example, a user wishing to access the BLOOMBERG PROFESSIONAL® service provided by Bloomberg LP accesses a system enrollment page by using the keyboard and input prompts displayed on a screen 601 and thereby accessing a system home or start-up page and entering a command ENROLL <GO>.

Upon receipt of the prospective user's request to enroll, e.g., the ENROLL <GO> command, at 1109 the secure system prompts the user for entry of an identifier uniquely associated with the access device 100. For example, the system displays a screen at display 601, prompting the prospective user to enter a serial number provided on the access device's housing 101, as for example by typing it at a keyboard or other input device associated with system 600.

Once the system has received a valid identifier entered by the prospective user, at 1113 the system prompts the prospective user with instructions for presenting to a biometric sensor such a biometric characteristic for acquisition of data representing the characteristic. For example, the system displays instructions directing the prospective user to place a thumb over a fingerprint sensor of, or to present an eye for retina scanning by, a biometric sensor 103. The instructions may be presented at a display 601 of the system 600, at output device 104, or in other suitable location. At 1117 the user follows the instructions and presents the biometric characteristic for the biometric sensor 103, and the sensor 103 scans the presented finger or retina, or otherwise acquires data representing the biometric characteristic. If necessary for activating the sensor, the prospective user activates the access device 100 by turning it on, as for example by operating a switch associated with a power supply, as for example switch 109 which also.

At 1121 the system determines whether the biometric data acquired from the prospective user, i.e., biometric data representing a biometric characteristic of the prospective user, is satisfactory for use in comparing data acquired in future samplings to the currently-acquired sample, to determine whether a suitable correlation exists for identifying the prospective user and authorizing presentation of an access code useable for accessing the secure system. The determination whether the acquired sample is satisfactory for use in making the comparison is made by processor(s) 105 of access device 100, by one or more processors associated with computer 600, by processors otherwise associated with the system to be accessed, or by any suitable combination of such processors. Criteria and processes to be used in making such determinations are known, and many new suitable criteria and processes are continuously being developed. The establishment and implementation of such criteria and processes will depend, inter alia, upon the biometric characteristics to be used, the degree of certainty desired in the correlation, and other factors, and will be within the ability of those of ordinary skill in the relevant arts.

If the sample is satisfactory, data representing the sample are stored in memory accessible to the processor(s) to be used in establishing the correlation, such as one or more of memories 147, 148, 149, or other memory associated with the access device or system to be accessed, and processing proceeds. If the sample is not satisfactory, as for example if the biometric characteristic was improperly positioned relative to the biometric sensor 103, the prospective user is prompted again at 1113 to re-present the biometric characteristic for re-sampling. The user may be prompted by the system to which access is desired, as for example by messages displayed on display 601, by messages displayed on output device 104, such as "bad print", or both. The prospective user may be invited to provide the biometric characteristic a set number of times before the system shuts down and, for example, requires the user to seek administrative help or to proceed according to other recommendations. For example, the cycle 1113-1121 may repeat 5 or another number of times, depending upon the objects of the secure system and those who administer it.

If the biometric data acquired at 1117 is suitable for establishing correlations with future samplings, at 1125 the prospective user is prompted to present the access pad 100 such that one or more of signal sensor(s) 102 are able to receive signals generated by the system to be accessed. For example, using the device depicted in FIGS. 1-3, the prospective user is prompted to present the device 100 in the manner shown in FIG. 6, so that photosensor 102, 131 may receive light signals from signal generation portion 603 of screen 601.

Upon receipt of signals from signal generating portion 603, at 1129 processor 105 causes an access code that may be used to access the secure system to be provided at output device 104, as for example by displaying a four-character code on an LED or LCD display.

In some embodiments of the invention, a code provided at output device 104 is provided only for a limited time period. This is useful, for example, in preventing unauthorized users from gaining access to the code and the secure system. For example, in some embodiments of the invention a four-character code is displayed on an LED display for approximately 20 seconds. It has been found that for controlling access to secure computer systems of the type contemplated herein, the 20 second period is adequate for allowing an authorized user to enter the code at a keyboard and for the secure system to receive and process the code, and grant access, while being short enough to prevent or reduce unauthorized access to the secure system.

In preferred embodiments of the invention, at least process steps 1109, 1113, 1117, 1121, 1125, and 1129 are performed wholly or at least partially by the portable access device 100.

Figure 8:
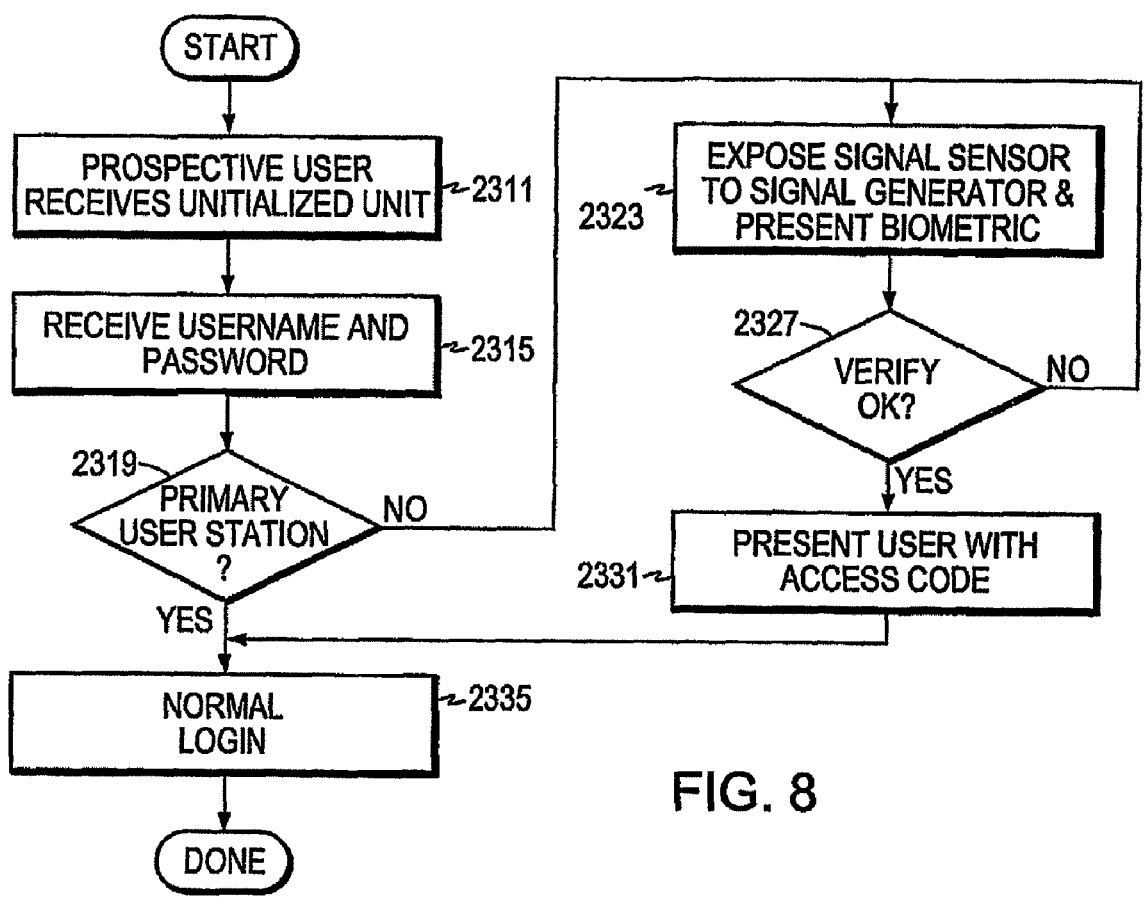

FIG. 8 is a schematic diagram of a process flow according to a preferred embodiment of the invention. The process depicted in FIG. 8 may be used to control access, in any one of multiple modes, to a secure system by providing to an output device 104 in suitable circumstances, an access code that may be used to access the secure system.

The process of FIG. 8 begins at 2311 when the prospective user accesses an authorization (e.g., log-in) function of the secure system to be accessed. For example, a user wishing to access the BLOOMBERG PROFESSIONAL® service provided by BLOOMBERG LP accesses a system log-in screen by using a keyboard 611 and input prompts displayed on a screen 601 at a system entry port such as a computer 600.

In response to a request from the entry port, at 2315 the secure system causes the prospective user to be presented with prompts, such as interactive input fields on a graphical user interface provided at screen 601, for the prospective users system identification number and a password. The entry port 600 forwards data input by the prospective user, along with an identifier of the entry port itself. For example, in a system such as the BLOOMBERG PROFESSIONAL® service, a subscribing (or otherwise authorized) user's computer terminal, or prospective entry port, is provided with proprietary software for providing an interface to the BLOOMBERG PROFESSIONAL® service by causing the user's computer terminal to act as an entry port to the service. This software, which resides at the user terminal, is designed to cause the system 600 to send to the BLOOMBERG PROFESSIONAL® service, under specified conditions including attempted log-in, an identifier used to uniquely identify the user terminal as a (prospective) entry port. The BLOOMBERG PROFESSIONAL® service retains in memory a record associating the user terminal with one or more prospective users. Thus, upon receipt at 2315 of a prospective user's system i.d., the prospective user's password, and a terminal identifier, the secure BLOOMBERG system is enabled to determine whether the prospective user is attempting to access the system using an entry port with which the user is normally associated, which the system's administrators may designate as a primary entry station for the prospective user.

Upon receipt of the prospective user's i.d. and password and the prospective entry port's identifier (if any), at 2319 the secure system determines whether the entry port has been defined as a primary entry station for the user.

If the prospective entry port has been identified as a primary entry station for the prospective user, at 2335 the user is presented with a request to provide any additional required information, and is granted access to the secure system. Access to the secure system at 2335 may be conditioned upon additional factors, such as correlation of data representing a biometric characteristic of the prospective user with stored biometric data. For example, at a primary entry station, such as a regular work station/terminal, a prospective user may be provided with a biometric sensor associated with the terminal, such as a sensor incorporated in a keyboard 611, and pre-authorization may be conditioned upon correlation of data acquired by the keyboard sensor and stored data, instead of, or in addition to, any data acquired by a sensor on the portable access device.

If at 2319 it is determined that the prospective entry port has not been identified as a primary entry station for the prospective user, as for example where a prospective user is attempting to access the secure system from a remote or visitor terminal, or via a network other than the user's primary terminal or network, at 2335 the user is presented at 2323 with instructions to present the portable access device in a fashion such that one or more of signal sensor(s) 102 are able to receive signals from the secure system, as for example by presenting the signal sensor 102 in the fashion shown in FIG. 6, so that sensor 102 is exposed to light rays emanating from signal generating portion 603. The prospective user may also be instructed to simultaneously present a biometric characteristic for scanning or other sampling or sensing by biometric sensor 103, as for example by presenting a fingertip as shown in FIG. 6.

At 2327 the system determines whether the biometric data acquired from the prospective user correlates satisfactorily with previously-acquired, stored data representing the same biometric characteristic. The determination whether the correlation between the acquired sample and the stored data is made by processor(s) 105 of access device 100, by one or more processors associated with computer 600, by processors otherwise associated with the system to be accessed, or by any suitable combination of such processors. Criteria and processes to be used in determining whether such correlations are satisfactory are known, and many new suitable criteria and processes are continuously being developed. The establishment and implementation of such criteria and processes will depend, inter alia, upon the biometric characteristics to be used, the degree of certainty desired in the correlation, and other factors, and will be within the ability of those of ordinary skill in the relevant arts.

If correlation is satisfactory, at 2331 output device 104 is provided with an access code that the prospective user may use to access the secure system, e.g., an alphanumeric code to be entered using a keyboard 611. Upon receipt of a valid access code, the secure system allows the user access, and proceeds with processing according to the normal rules of the accessed system, for example by providing suitable graphical user interfaces, etc. Access codes provided may be session specific, i.e., valid only for so long as the prospective user continues to use the access system continuously, or opens a controlled door a single time, etc., and may be presented at output device 104 only for a limited time, e.g., 20 seconds, as previously explained.

In preferred embodiments of the invention, at least process steps 2323, 2327, and 2331 are performed wholly or at least partially by the portable access device 100.

Figure 9:
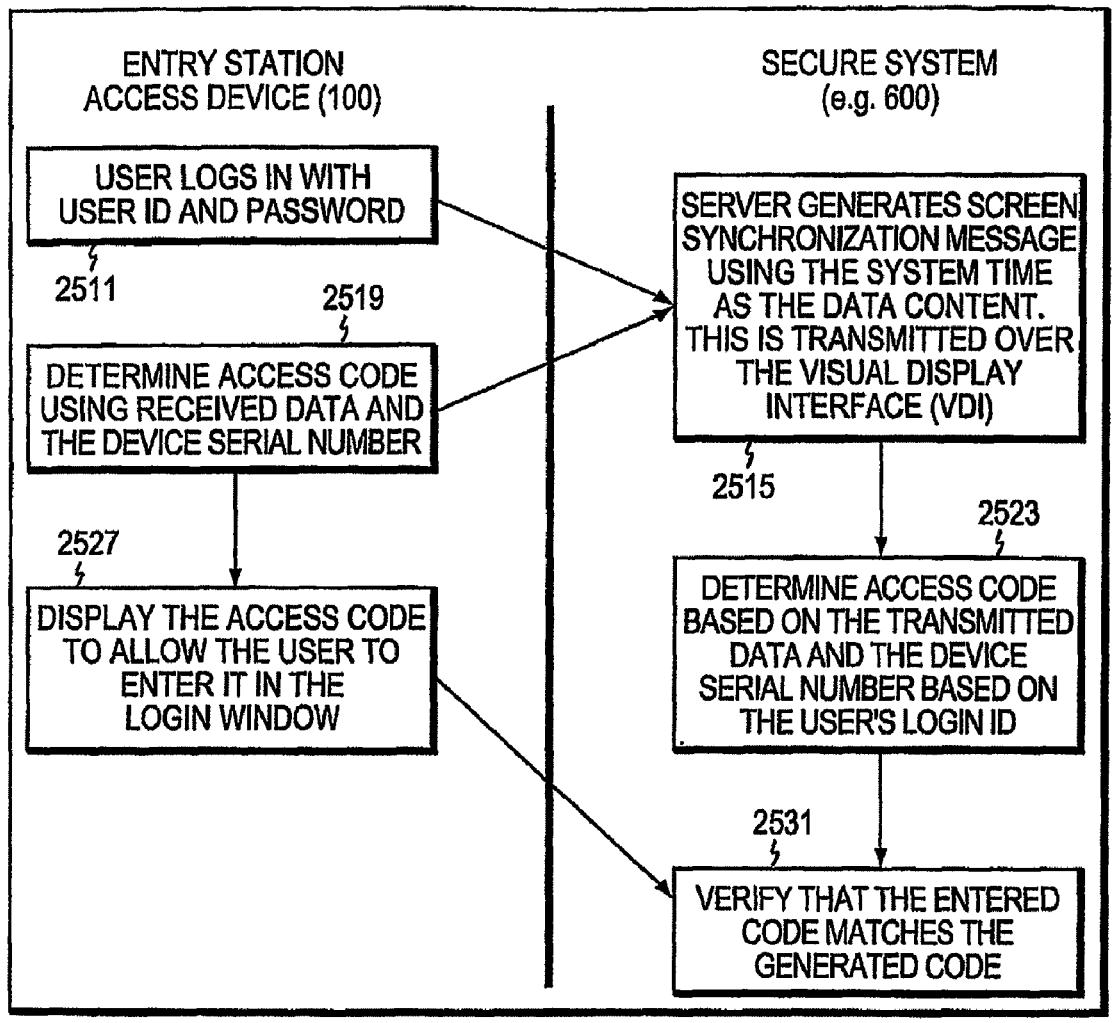

FIG. 9 is a schematic diagram of a process flow for processing a signal generated by a secure system to provide an access code that may be used to access the secure system. Process steps shown on the left side of FIG. 9 are performed by a processor of the access device 100 and/or by the entry station, those on the right side by a processor or processors associated with the secure system.

At 2511 the prospective user invokes the system log-in screen using a keyboard 611 or other input device at the entry station, as described above, and enters his/her user i.d. and password, and/or other identifying information.

Upon receipt of the user-identifying information, at 2515 a processor associated with the secure system generates a signal to be sent to the portable access device 100. The signal is generated using the system time to define data content for the signal. The signal may also be based on other data, derived for example from a station i.d. provided by the prospective entry station as described herein. The signal is transmitted by causing a display 601, which may be referred to as a Visual Display Interface, or VDI, at the entry station 600 to intermittently transmit light, as for example by flashing signal generating portion 603 between white or other bright color and off or some dark color such as black. Several suitable methods of using displays to generate light signals are known, and many are or will hereafter be developed.

At 2519 a signal sensor 102, such as a photosensor 131, at the portable access device 100 receives the signal from the signal generator and forwards it to processor(s) 105. Processor(s) 105, processing the signal and optionally a serial number or other identifier associated with the access device 100, generates an access code that may be used by the prospective user to access the secure system, as for example by inputting the access code at the entry station by using a keyboard 611.

In parallel to the process at 2519, at 2523 the secure system, using the same algorithm used by the portable access device, or a related algorithm, determines an access code, and preferably the same access code determined by the access device 100, that may be used by the prospective user to access the secure system.

At 2527 processor(s) 105 provide the access code to the output device 104, as for example by displaying an alphanumeric code on an LED or LCD display panel. A four-character code has been found to be useful for systems of the type described herein, in which the prospective user must read the access code and enter it at the entry station within a limited amount of time, as for example 20 seconds. Other-length codes may be useful in similar or different situations.

Provision of the access code to the output device at 2527 may be conditioned upon correlation of biometric data acquired by a sensor 103 from the prospective user with previously stored biometric data, as herein described.

At 2531 the secure system compares the access code received from the entry station to the access code determined by the secure system at 3523. If the access codes are the same, or are satisfactorily related according to standards accepted by the secure system, the user is allowed access to the secure system. The system proceeds with allowed processing, as for example providing suitable graphic user interface displays and accepting input for further processing according to the system.

If the access codes are not identical or sufficiently correlated, the system may warn the prospective user and afford one or more opportunities for retrying, or may recommend that the prospective user seek administrative or technical help, as appropriate.

Many other processes for generating access codes, including the use of coding seeds, are presently known and no doubt hereafter to be developed, and are suitable for use with the invention. The adaptation of any such processes for use in conjunction with the invention will be well within the ability of those of ordinary skill in the arts, once they have been made familiar with this disclosure.

While the invention has been described and illustrated in connection with preferred embodiments, many variations and modifications as will be evident to those skilled in the relevant arts may be made without departing from the spirit and scope of the invention, and the invention is thus not to be limited to the precise details of methodology or construction set forth above as such variations and modifications are intended to be included within the scope of the invention. Except to the extent necessary or inherent in the processes themselves, no particular order to steps or stages of methods or processes described in this disclosure, including the Figures, is implied. In many cases the order of process steps may be varied without changing the purpose, effect, or import of the methods described.

What is claimed is:

1. A method of providing a code for use in accessing a system, the method performed by an access device comprising a processor, a signal sensor, and a biometric sensor, the method comprising:

the processor of the access device processing a signal received by the signal sensor of the access device from a signal generator associated with the system to be accessed to determine whether the system has received information indicating that a person seeking access to the system is attempting to access the system using a primary entry station;

if it is determined by the access device using the signal received by the signal sensor that the person is attempting to access the system using a primary entry station, the access device providing to an output device thereof an access code that can be used to access the system regardless of any biometric information received from the biometric sensor of the access device;

otherwise the access device providing to the output device thereof an access code that can be used to access the system only upon determination that a correlation criteria is satisfied by biometric information received from the biometric sensor and stored biometric information.

2. The method of claim 1, wherein the access code is session-specific.

3. A method of selectively providing a code for use in accessing a system such as a computer system, the method performed by an access device comprising an output device, a processor, a signal sensor, and a biometric sensor, the method comprising:

in response to an attempt to access the system using an authorization function associated with the system from a primary entry station, the system granting access thereto;

otherwise, in response to the attempt, receiving by the signal sensor of the access device a signal from a signal generator associated with the system to be accessed, and the access device generating the access code based on the received signal; and the access device providing the access code to the output device thereof only upon determination of a correlation criteria between biometric information received by the biometric sensor from a person attempting to access the system and stored biometric information.

4. The method of claim 3, wherein the authorization function comprises a system log-in comprising a user name, a password, or both.

* * * * *